Nov. 10, 1970 AKIRA IMAMURA 3,539,730

TWO-STAGE LINK CONNECTION SYSTEM USING CROSS-BAR SWITCHES

Filed Dec. 14, 1967 3 Sheets-Sheet 1

INVENTOR.
AKIRA IMAMURA

BY

OSTROLENK, FABER, GERB & SOFFEN

ATTORNEYS

INVENTOR.
AKIRA IMAMURA
BY
OSTROLENK, FABER, GERB & SOFFEN
ATTORNEYS

TWO-STAGE LINK CONNECTION SYSTEM USING CROSS-BAR SWITCHES

INVENTOR.
AKIRA IMAMURA
BY
OSTROLENK, FABER, GERB & SOFFEN
A ...NEYS 3,539,730

TWO-STAGE LINK CONNECTION SYSTEM USING CROSS-BAR SWITCHES

Akira Imamura, Tokyo, Japan, assignor to Nippon Electric Company Limited, Tokyo, Japan, a corporation of Japan Filed Dec. 14, 1967, Ser. No. 690,472
Claims priority, application Japan, Dec. 17, 1966, 41/83,096
Int. Cl. H04q 3/42
U.S. Cl. 179—18 2 Claims

ABSTRACT OF THE DISCLOSURE

A two-stage link connection system for coupling incoming lines to outgoing lines and employing crossbar switches. Each crossbar switch is divided into at least two groups with each group being assigned to a different lattice. Links connecting the lattices are made between that group of a crossbar switch assigned to a first lattice and the group of another crossbar switch assigned to the second lattice so that no connections are made between groups of the same crossbar switch thereby enabling simultaneous switching of both groups of a crossbar switch in each lattice to significantly reduce switching time and connections and to allow use of such a system in common with cordless type switchboard frames.

GENERAL DESCRIPTION

The present invention relates to telephone systems and more particularly to a two-stage link connection system in automatic telephone switchboards employing crossbar switches.

In telephone switching networks it has been conventional to employ crossbar switches respectively for the primary lattice and the secondary lattice of a switching system when the main speech channel of a crossbar switchboard comprises a two-stage link. In such cases, optimum design conditions are not always achieved due to the fact that the method of dividing the crossbar switch is restricted. Accordingly, it becomes necessary to employ many crossbar switches therein thereby making such installations rather costly.

The present invention is characterized by providing a design which eliminates such disadvantages by employing an arrangement in which a plural number of crossbar switches are used wherein each crossbar switch is divided into two parts in accordance with their vertical groups. The first part is assigned to the primary lattice and the remaining part is assigned to the secondary lattice. The links between the primary and secondary lattices are formed by connecting the outgoing lines from the primary lattice of one crossbar switch to the secondary lattice of another crossbar switch. No connections whatsoever are made between the primary and secondary lattices of the same crossbar switch.

The design of the present invention permits the degree of freedom of crossbar switches to be increased through the use of the dividing technique thereby achieving an optimum frame arrangement. This is especially valuable in the case of private automatic branch exchanges employing cord switches wherein the necessary number of crossbar switches can be significantly reduced. Thus, an economical automatic telephone switchboard can be obtained through the employment of the principles of the present invention.

It is therefore one primary object of the present invention to provide a novel two-stage switching system employing crossbar switches wherein each crossbar switch is divided into at least two groups, which groups are assigned to primary and secondary lattices, respectively, wherein the links connecting the crossbar groups of the lattices are coupled between the groups of differing crossbar switches to enable high-speed switching through the use of a reduced number of crossbar switches.

These as well as other objects of this invention will become apparent when reading the accompanying description and drawings in which.

Figure 1:
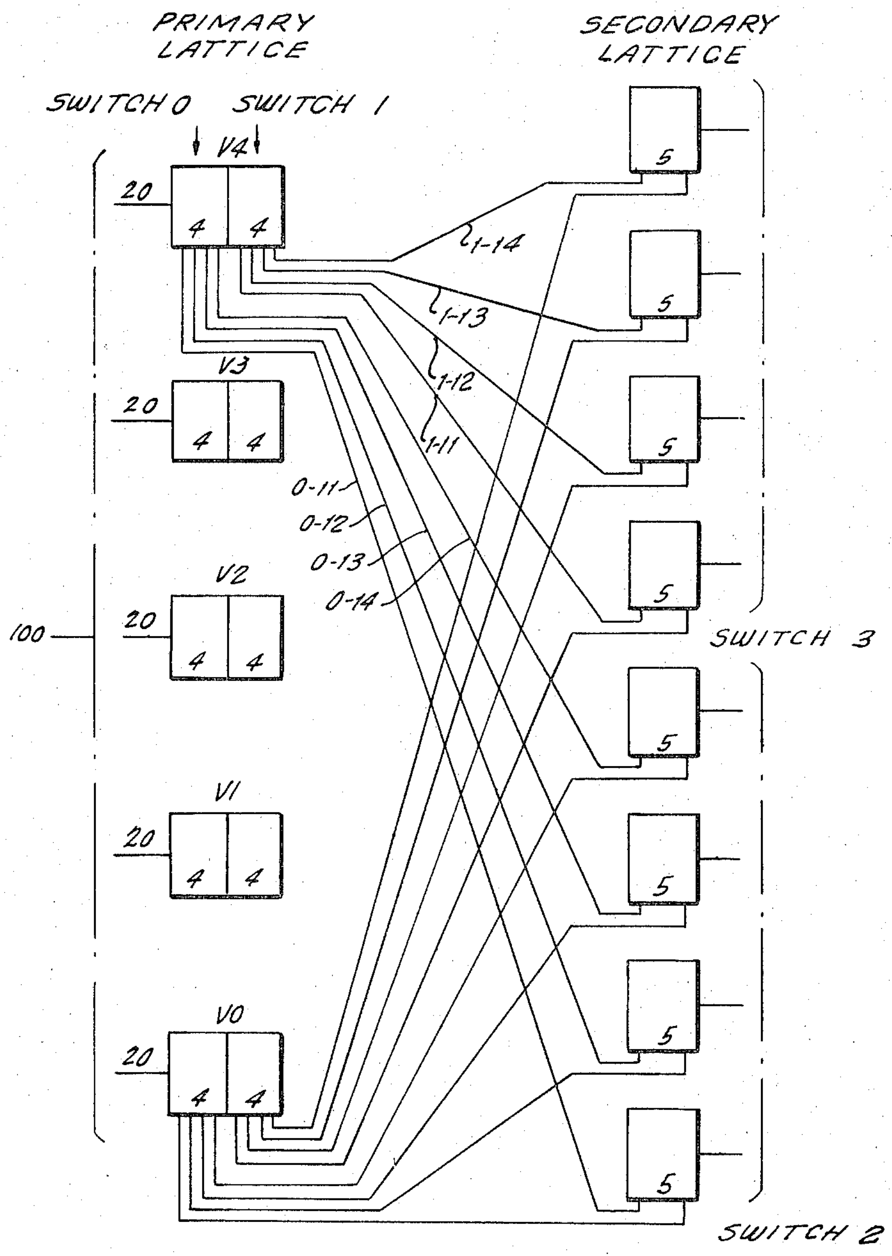
FIG. 1 Prior Art
FIG. 1 is a block diagram showing a frame arrangement of a conventional two-stage connection composed of eight links and employing four crossbar switches.

FIG. 1 shows a conventional link frame formation of the two-stage link type. In accordance with FIG. 1, four crossbar switches (switches 0–3) are required to provide a basic formation for handling 100 incoming lines which are received at the left-hand end of the figure. The arrangement is comprised of a primary and a secondary lattice. The primary lattice is comprised of two crossbar switches, switch 0 and switch 1. Each switch is comprised of five sections, each being connected to twenty incoming lines. Each switch of the primary lattice, in turn, is provided with four outgoing lines per section, which lines are connected by means of four links to the secondary lattice. For example, the topmost section of switch 0 is coupled to the four sections of switch 2 by means of links 0–11 through 0–14. In a like manner, the top section of switch 1 is coupled to the sections of switch 3 through links 1–11 through 1–14. Each of the remaining sections of switches 0 and 1 in the primary lattice are connected in a similar manner. The connecting links for the middle three sections $V_1$–$V_3$ of switches 0 and 1 have been omitted for purposes of clarity, it being understood that these switches are connected to the secondary lattice in a similar fashion. The number of links per primary lattice depends on design conditions, i.e. the allowable amount of traffic. On the other hand, when a cord type switchboard is employed in a private automatic branch exchange, eight links are usually not needed in the primary lattice such as is shown in the formation of FIG. 1 due to the fact that the terminating call from the central line does not act as a load on the main speech channel. However, in the formation of the two-stage switching system of FIG. 1, two crossbar switches must be provided for the primary and secondary lattices, respectively, making a total of four crossbar switches, even when the number of links per primary lattice is reduced to six. In other words, it is not possible to reduce the number of crossbar switches required in a system of the type shown in FIG. 1 in spite of the reduced traffic requirements.

Figure 2:
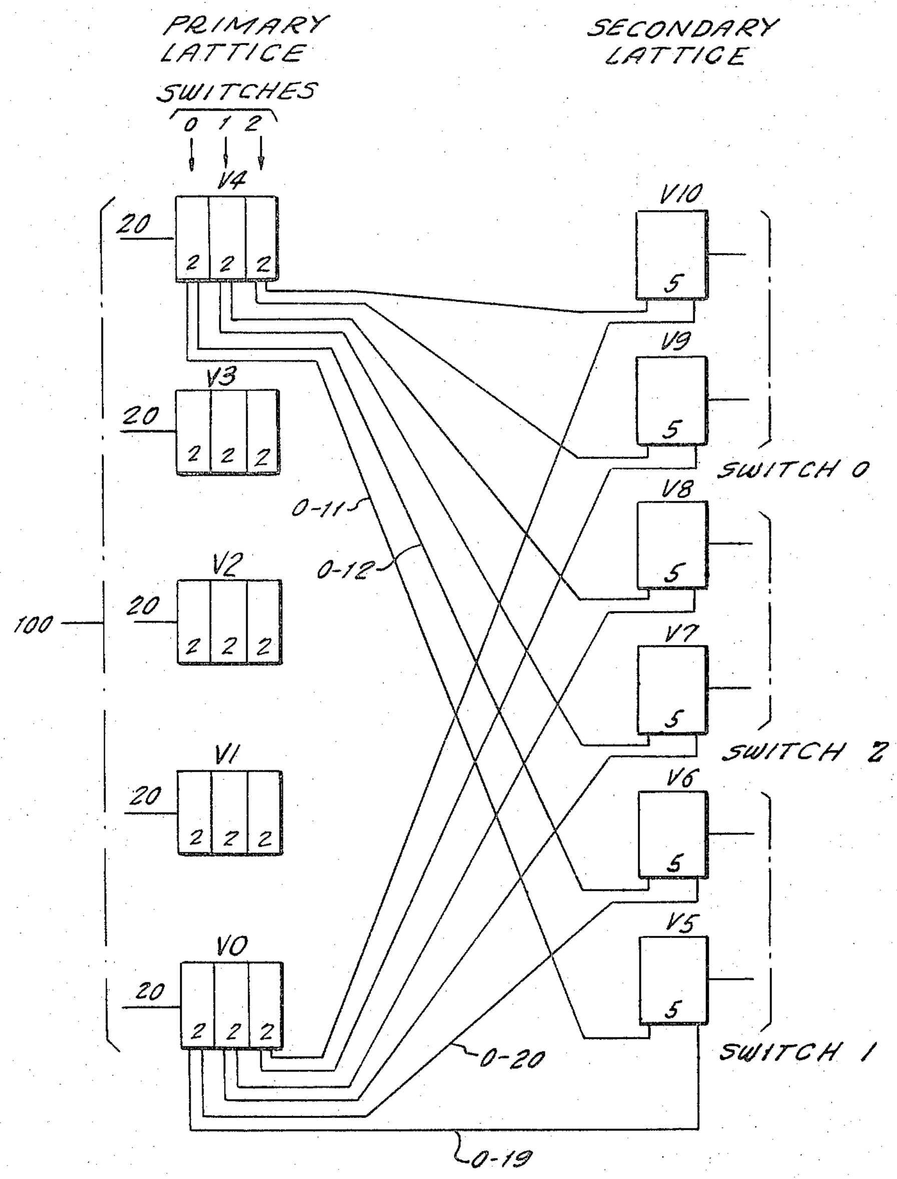
FIG. 2 is a schematic diagram of a two-stage switching system of the six-link type employing three crossbar switches and which is designed in accordance with the principles of the present invention.

FIG. 2 illustrates an example of a link formation designed in accordance with the present invention. In the embodiment of FIG. 2, 100 incoming lines can be accommodated through the use of three crossbar switches (switches 0–2) each having 20 vertical channels, while the number of links per lattice is reduced to six. In the speech channel of a two-stage link connection, both the primary and secondary lattices can be operated simultaneously by dividing each crossbar switch into two groups. Considering crossbar switch 0, for example, a first group thereof is comprised of five sections $V_0$–$V_4$ assigned to the primary lattice. Each of the five units has two vertical channels. The other group of switch 0 is comprised of two sections $V_9$ and $V_{10}$ with each section having five vertical channels. The links connecting the primary lattice to the secondary lattice are arranged in such a manner that the links do not connect first and second groups of the same switch. More specifically, the links from switch 0 of the primary lattice are connected to switch 1 of the secondary lattice; the links from switch 1 of the primary lattice are connected to switch 2 of the secondary lattice; and the links from switch 2 of the primary lattice are connected to the switch 0 of the secondary lattice. Considering switch 0, the topmost section $V_4$ is provided wtih two vertical channels which are connected to associated channels of sections $V_5$ and $V_6$ of switch 1 which are arranged in the secondary lattice, the links being designated by the numerals 0–11 and 0–12. The remaining sections $V_3$–$V_0$ of switch 1 are connected to sections $V_5$ and $V_6$ of switch 1 in a like manner, the links of section $V_0$ being designated by the numerals 0–19 and 0–20, respectively. The links coupling the middle three sections $V_1$–$V_3$ of switch 0 (which would be connected to sections $V_5$ and $V_6$) have been omitted for purposes of clarity.

With the arrangement of FIG. 2, it is possible to operate the two groups of each crossbar switch simultaneously to obtain reduced switching speeds. For example, any one of the five sections $V_0$–$V_4$ of switch 0 may be operated simultaneously with either of the sections $V_9$ and $V_{10}$ of switch 0 arranged in the secondary lattice. Such simultaneous operations may also be performed with regard to the remaining switches 1 and 2 of the arrangement of FIG. 2.

Figure 3:
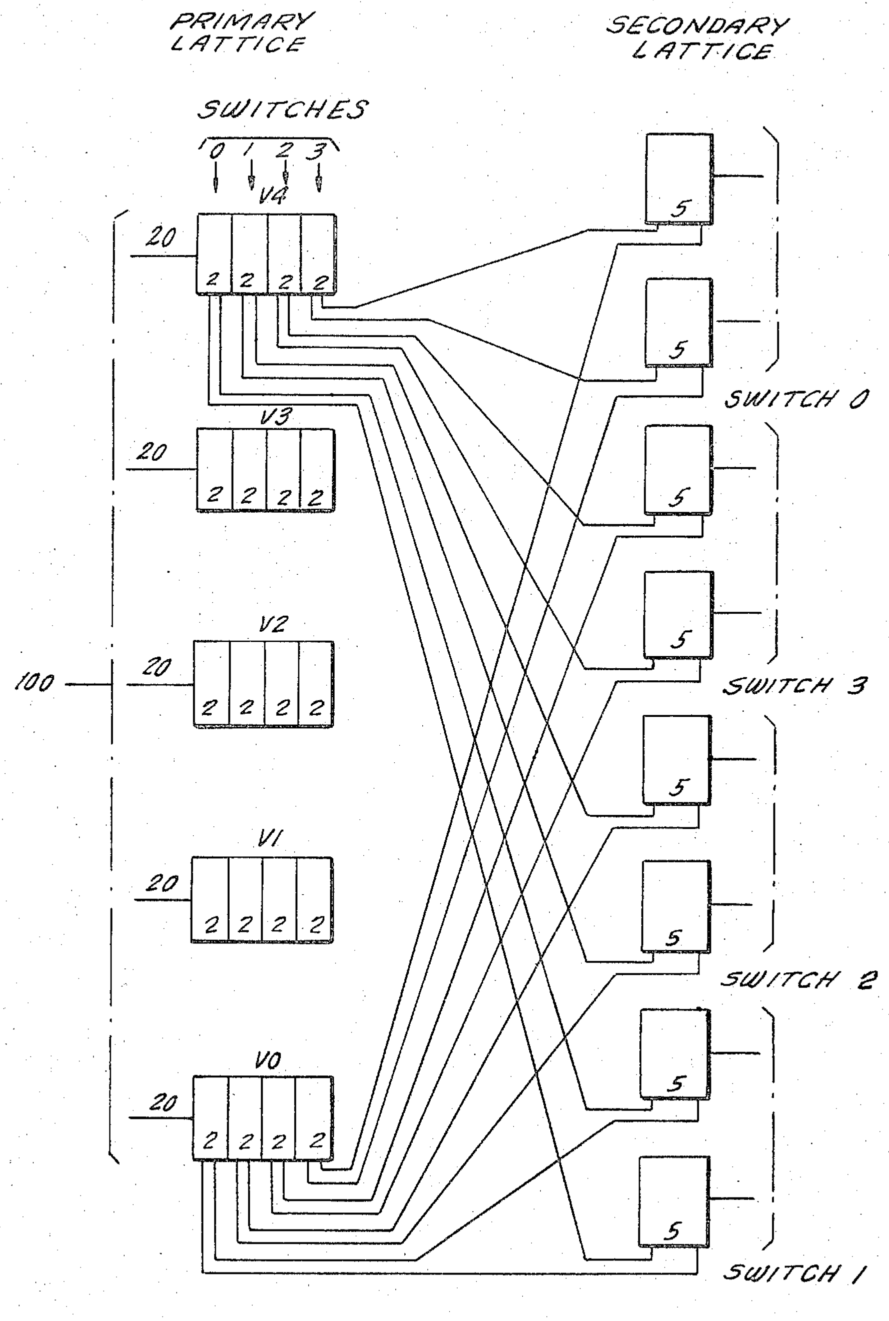
FIG. 3 is a block diagram showing another preferred embodiment of the present invention in which the frame formation of FIG. 2 is expanded into an eight-link arrangement employing four crossbar switches.

FIG. 3 shows another preferred embodiment of the present invention. In this arrangement one more crossbar switch, switch 3, is added to the link formation which is of the type shown in FIG. 2 so that the number of links per primary lattice is 8. The number of necessary crossbar switches is the same as that shown in the conventional technique of FIG. 1, but the arrangement of FIG. 3 can be advantageously realized by adding only one more crossbar switch to the formation of FIG. 2. The outstanding feature of this technique is that, in private automatic branch exchanges, the control equipment of the cord type switchboard frame having a 6-link formation may be used in common with the cordless type switchboard frame of eight-link formation.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A two-stage link connection system for coupling incoming and outgoing lines comprising a plurality of crossbar switches; each of said crossbar switches being divided into first and second parts in accordance with their vertical groups;

a first and a second lattice; the first part of each crossbar switch being assigned to said first lattice;

the second part of each crossbar switch being assigned to said second lattice;

a plurality of connecting links coupling the switches of the first and second lattice;

the first part of each crossbar switch having a plurality of horizontal lines for receiving incoming lines and a plurality of vertical lines each coupled to an associated link;

the second part of each crossbar switch having at least one horizontal line for connection with outgoing lines and a plurality of vertical lines each coupled to an associated link;

said connecting links being arranged to connect the first part of each crossbar switch to the second part of a different crossbar switch.

2. The system of claim 1 wherein the vertical lines of the first part of each switch are divided into predetermined groups;

said vertical lines of the second part of each switch being divided into a plurality of groups;

said connecting links connecting the vertical lines of said first part of a switch to the vertical lines of said second part of a different switch.

References Cited

UNITED STATES PATENTS 3,349,189 10/1967 Van Bosse.

KATHLEEN H. CLAFFY, Primary Examiner

W. A. HELVESTINE, Assistant Examiner